United States Patent [19]

Dittakavi et al.

[11] Patent Number: 4,457,719

[45] Date of Patent: Jul. 3, 1984

[54] ELECTRONIC LEARNING AID FOR PROVIDING SEQUENCING AND SPELLING EXERCISES

[75] Inventors: Ashok Dittakavi; Barbara Thompson, both of Lubbock, Tex.

[73] Assignee: Texas Instruments Incorporated, Dallas, Tex.

[21] Appl. No.: 382,009

[22] Filed: May 25, 1982

[51] Int. Cl.³ .............................................. G09B 5/06
[52] U.S. Cl. .................................... 434/159; 434/335; 434/176; 434/201; 434/205; 434/169; 381/52
[58] Field of Search ............... 434/313, 312, 335, 338, 434/339–341, 205, 319–321, 156, 157, 169, 176, 201, 159; 179/15 M, 15 F; 381/51, 52

[56] References Cited

U.S. PATENT DOCUMENTS 4,308,017 12/1981 Laughon ............................ 434/169
4,337,375 6/1982 Freeman ............................ 434/313
4,406,626 9/1983 Anderson et al. .................. 434/169

*Primary Examiner*—Richard C. Pinkham
*Assistant Examiner*—Leo P. Picard
*Attorney, Agent, or Firm*—Robert D. Marshall, Jr.; Leo N. Heiting; Melvin Sharp

[57] ABSTRACT

Disclosed is an electronic learning aid having modes of operation to provide an interesting and effective learning experience to a student. In the preferred embodiment, inputs to the learning aid are effected via scanning of a bar code on a page by the student. In a first mode, the student is audibly directed to place depicted objects on the page in some specific sequence, as by alphabetical order of the first letter of the names of the objects. The student selects items in the sequence by scanning bar code associated with each item and the system audibly informs him of his progress in correctly identifying times of the sequence. In a second mode the student upon scanning the bar code associated with a depicted object is audibly directed to spell the name of that object. The system audibly informs him of his progress.

11 Claims, 6 Drawing Figures whale frog alligator monkey

A  B   D

Y

ELECTRONIC LEARNING AID FOR PROVIDING SEQUENCING AND SPELLING EXERCISES

BACKGROUND OF THE INVENTION

This invention relates to electronic educational products and more specifically to speaking electronic educational products.

In recent years there have become available a number of electronic educational learning aid products, an early example of these being the Little Professor* mathematics learning aid. This product presents mathematical problems to an operator by means of a visual display and the operator enters attempted solutions to the problem via a keyboard. The product then indicates to the operator the correctness of his response. In addition there has appeared a series of learning aids which have the additional capability of communicating to the operator by means of electronically synthesized speech. Examples of these include the Speak & Spell*, Speak & Math*, and Speak & Read* electronic learning aids (*trademark of Texas Instruments Incorporated).

More recently there has been disclosed in Freeman U.S. Pat. No. 4,337,375, entitled "Manually Controllable Data Reading Apparatus for Speech Synthesizers", issued June 29, 1982, a new type of system which has the capability of communicating to the operator by means of electronically synthesized speech. This system is distinguished by the fact that the words that are to be spoken are identified to the system by the operator through the use of an optical code reading instrument. The code, which may comprise a bar code of the type that has been used by grocers on certain of their products, may typically appear on the pages of a book below a line of corresponding printed text. Thus, an operator, who may typically be a child seeking to gain reading facility, when he encounters words or phrases that he does not recognize, may pass the optical reading instrument over the corresponding coded material thereby causing the system to speak the word or phrase. It will be seen therefore that such a system comprises a powerful learning aid in that it will selectively provide for the student verbalization of those words and phrases which he does not recognize in the printed text. It will be appreciated that a learning aid with such capability may have application to students of a wide variety of ages including preschool students.

A problem, particularly with students of younger ages, is to provide systems which will not only be effective in imparting the educational content, but which will also provide an enjoyable experience so as to maintain the interest of the student. In accordance with the various embodiments of this invention, there is provided a code reading speaking learning aid of the type described above, which has a plurality of modes of operation so as to provide the student with variety and stimulation in the educational experience.

SUMMARY OF THE INVENTION

The code reading speaking apparatus is provided with a sequence mode of operation. Here a plurality of items are depicted on a page, each with its associated bar code. The student or other operator is directed to place the object in some specific sequence order which he attempts to do by wanding the bar codes underlying the depicted items. In the event of incorrect choices the student is informed of the error and requested to try again.

In a spelling mode of the invention one or more objects are depicted on the page each with associated bar code. Additionally the alphabet is depicted on the page, each letter having associated bar code. The student or operator initiates the exercise by wanding the bar code associated with one of the depicted objects. As a result he is directed to spell the name of that object which he attempts to do by selectively wanding the bar codes beneath the letters of the displayed alphabet. Again in the event of an incorrect choice of letters he is requested to try again.

It is therefore an object of the invention to provide a code reading speaking learning aid which provides interesting and effective learning exercises to a student or operator.

It is another object of the invention to provide a code reading speaking learning aid which provides a student or operator with an exercise in placing items in some described sequence order.

It is a further object of the invention to provide a code reading speaking learning aid wherein the student or operator is provided with experience in spelling the names of objects.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION

Figure 1:
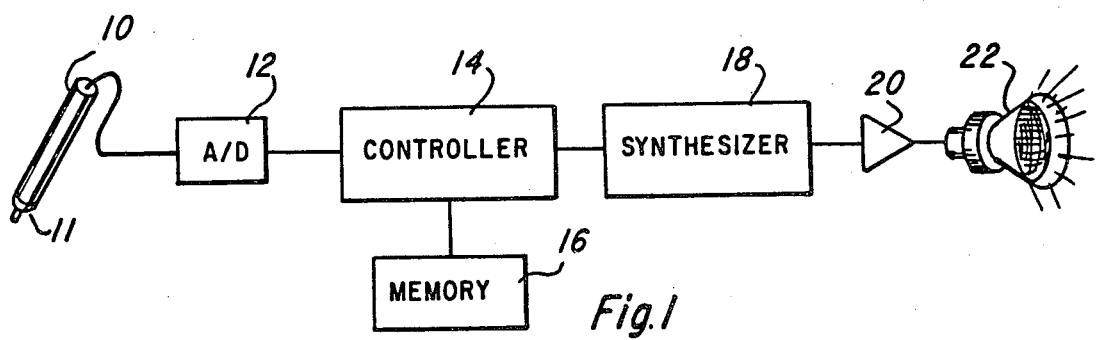
FIG. 1 is a block diagram of the apparatus of the present invention.

With reference to FIG. 1 there is shown a block diagram of the claimed system. The input to the system comprises an electro-optical wand 10 which is used to scan and detect bar code located on the medium to be read. Illumination of the bar code, typically by means of infra-red energy, and sensing of the energy reflected from the bar code is accomplished by means of a head 11. Such electro-optical wands are well known in the art and typically comprise means for generating the illuminating energy, as well as means for detecting and converting the reflections from the bar code to electrical energy. A particularly convenient mechanism for transmitting the illuminating energy and the reflected energy is that disclosed in copending U.S. patent application Ser. No. 308,346, filed Oct. 5, 1981 and assigned to the assignee of the present invention. In the preferred embodiment of the invention the bar code to be read by the wand will have one of two colors, black or white, although in other embodiments it may be preferrable to use multicolor bar code. In the case of two color bar code the electrical signal output by wand 10 is analog in nature, but basically has two discrete levels corresponding to the two colors comprising the bar code.

The output of the scanning wand 10 is digitized in analog to digital converter 12. Functionally, A/D converter 12 amounts to an overdriven amplifier which serves to square up the analog waveform from wand 10 so that the output of A/D converter 12 is a well defined digital signal having one of two discrete levels.

The output of A/D converter 12 is coupled to an input of controller 14, which in the preferred embodiment comprises a model TMS 7040 8-bit microcomputer available from Texas Instruments Incorporated. Controller 14 utilizes information derived from the bar code by wand 10 to control the operation of the system as claimed.

To accomplish spoken or other auditory communication to the user of the system, controller 14 in the preferred embodiment provides digital auditory information to synthesizer 18 which may comprise a model TMS 5220A voice synthesis processor also available from Texas Instruments Incorporated. Synthesizer 18 utilizes the digital input information to synthesize an analog sound waveform which is in turn provided to amplifier 20. Amplifier 20 in turn provides the analog signal at a suitable level to speaker 22 for generation of the audible information.

In the preferred embodiment, at least some of the digital data used by synthesizer 18 is stored in the form of allophones. As is well known by those skilled in the art, allophones are basic units of speech which may be combined in suitable sequences so as to provide the sounds, words, phrases and the like that are useful in human communication. The digital data which is used by synthesizer 18 to synthesize the individual allophone sounds are stored in memory 16 which in the preferred embodiment comprises a read only memory (ROM).

Figure 2:
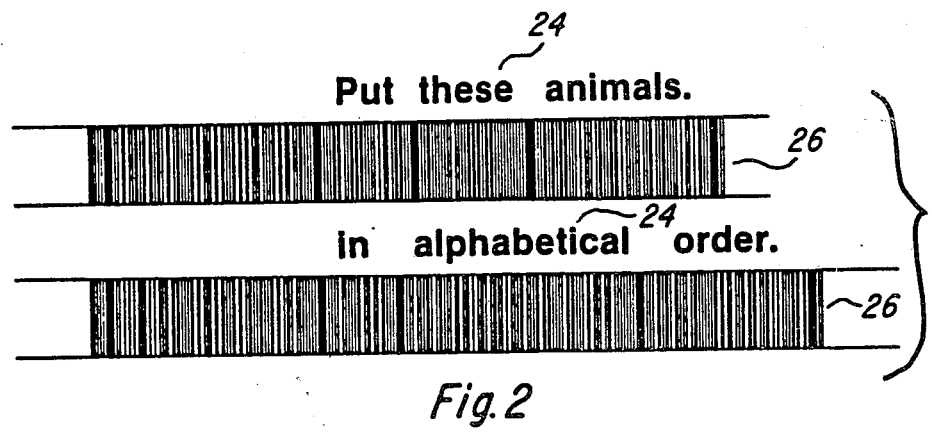
FIG. 2 illustrates the relationship between alphanumeric data and the bar code as used in the present invention.

Various types of information are available from the bar code located on the printed medium such as a page of a book. An example of a portion of such a page is illustrated in FIG. 2. When the wand is passed over the bar code 26 the system will enunciate the phrase comprised of the words 24. The portion of the bar code underlying each of these individual words serves to identify the sequence of allophones that is required in each case to produce the corresponding word. It will be noted however that the two lines of bar code illustrated each has a considerable portion to the left of the area in which the words of the phrase appear. This additional bar code serves in part to provide prosody information for the corresponding phrase. Such prosody information serves to indicate a desired pitch variation and duration for the individual allophones. In the absence of such prosody information the sequence of allophones when assembled would result in relatively monotonic speech. With the use of the prosody information, the speech is produced in a more familiar and pleasing fashion.

Further, the bar code located to the left of the region where the words appear also provides information about the nature of the activity. The system illustrated in FIG. 1 has various modes of operation, each of which is initiated by information derived from the pages of the book itself. This mode information which is derived from the left portions of the bar code 26 illustrated in FIG. 2 is utilized by controller 14 to direct appropriate functioning of the system. Thus in the example of FIG. 2, when the operator passes the wand over the bar code the system utilizes the prosody and allophone identification data in the bar code to access the digital information for the appropriate allophones from ROM 16, and to modify this data in accordance with the prosody information before passing the digital signals to synthesizer 18 for sound synthesis. In addition the bar code has informed controller 14 to place itself in a mode wherein the operator is required to identify a plurality of characters in an alphabetical order. As will be subsequently described, other modes of operation are possible.

The acquisition of prosody and allophone identification from scanned bar code is disclosed in U.S. patent application Nos. 381,986 and 381,987 filed the same date as the present application, also assigned to the assignee of the present invention.

Figure 3:
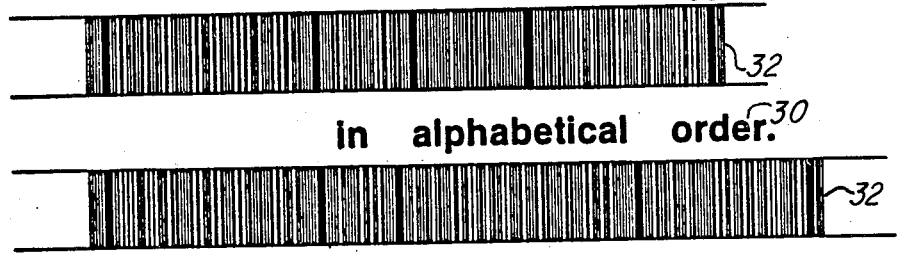
FIG. 3 is an illustration of a typical page of a book used in the sequencing mode of the invention.
Figure 3:
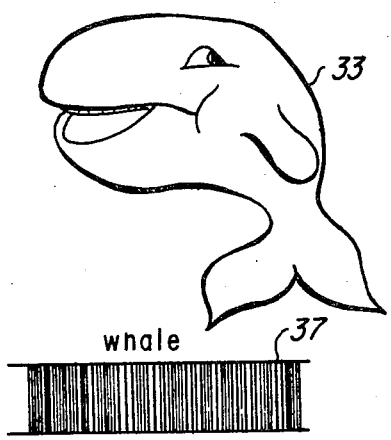
Figure 3:
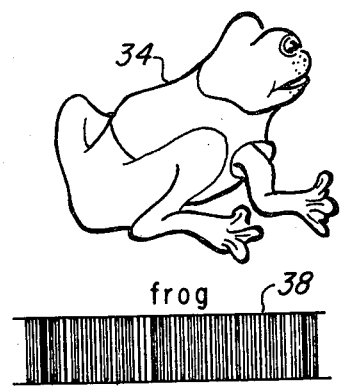
Figure 3:
Figure 3:
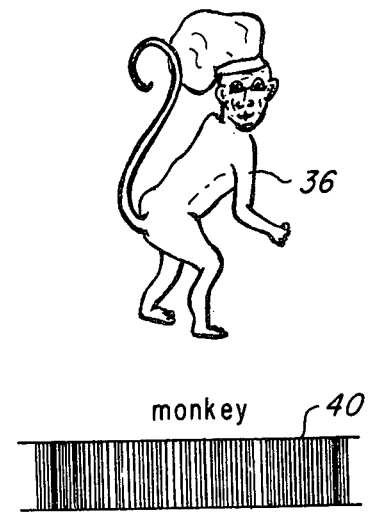
Figure 4:
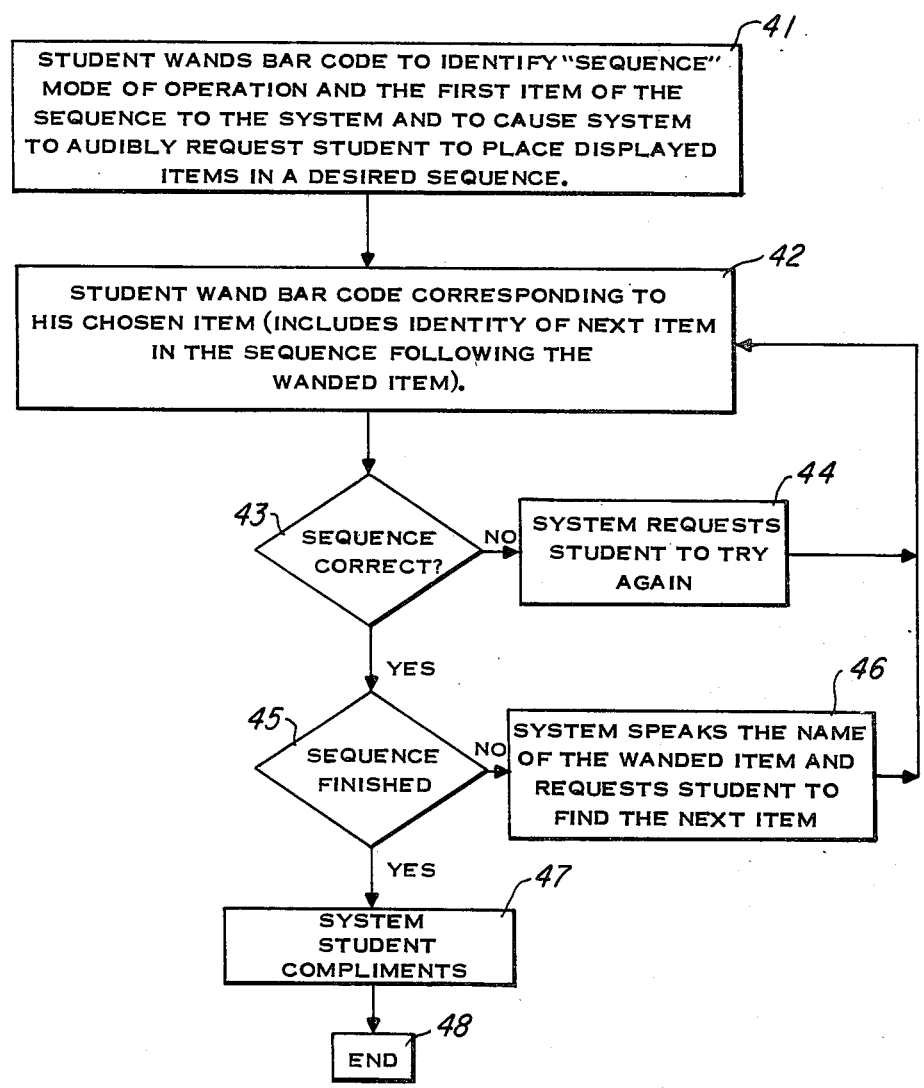
FIG. 4 is a flow chart illustrating the steps of the sequencing mode of the invention.

FIG. 3 is an illustration of a typical page of a book that is used in the sequence mode of the invention. FIG. 4 is a corresponding flow chart which illustrates the steps performed by the apparatus in the sequence mode. Shown at 30 is printed matter which directs the student to place certain depicted items in some specific order. The bar code 32 appearing below printed matter 30, when wanded by the student, causes this direction to be voiced by synthesizer 18. Further, as illustrated at step 41 of the flow chart, bar code 32 also identifies to controller 14 the fact that the sequence mode of operation is to be implemented and also the identity of the first item in the desired sequence (the alligator in the illustration of FIG. 3).

Also appearing on the page illustrated in FIG. 3 are a plurality of items 33 through 36 along with the printed names of these items. Additionally there appear bar codes 37 through 40 each associated with one of the above identified items. As shown in step 42 of the flow chart, the student seeks to identify the proper item in the sequence by wanding the bar code associated with the item of his choice. This bar code provides controller 14 with the identity of the item chosen by the student and also discloses to the controller 14 the identity of the next item in the sequence following the presently wanded item. At step 43 controller 14 checks the student's choice to determine whether he has chosen the proper item for this point in the sequence. In the event of an incorrect selection the system at step 44 requests the student to try again. Alternatively if the student has made a correct choice then the system at 45 checks to see whether the last item in the sequence has been selected. If the sequence has not been completed then at step 46 the system enunciates the name of the most recently wanded item and requests the student to proceed to find the next item in the sequence. Ultimately when the entire sequence has been appropriately identified, the system at step 47 compliments the student and proceeds to step 48 where it enters a wait state. At this point the system is ready to proceed to additional exercises.

Figure 5:
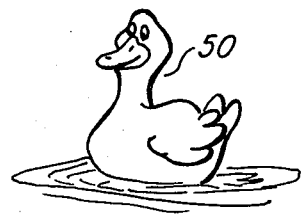
FIG. 5 is an illustration of a typical page of a book used in the spelling mode of the invention.
Figure 5:
Figure 5:
Figure 5:
Figure 5:
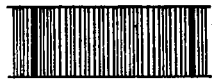
Figure 5:
Figure 5:
Figure 5:
Figure 6:
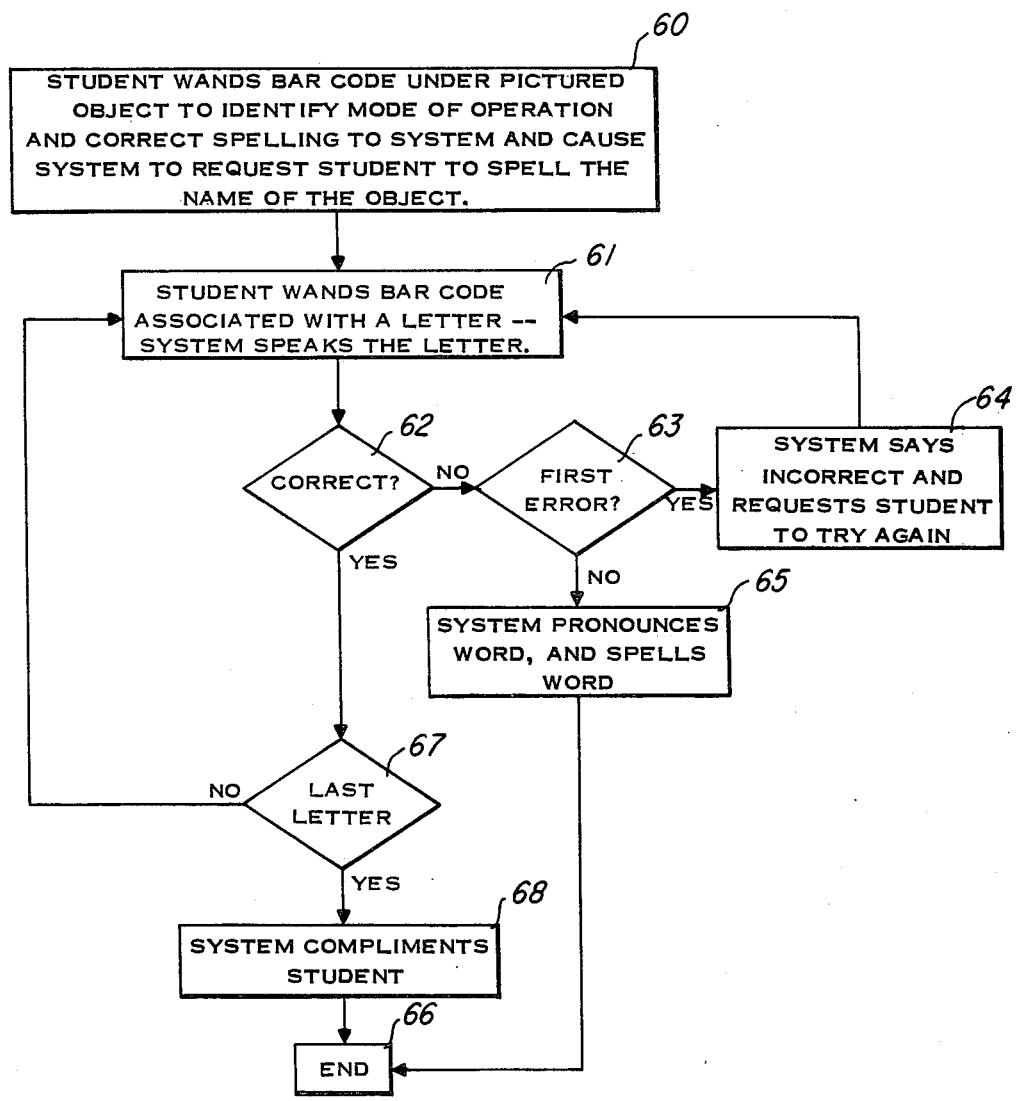
FIG. 6 is a flow chart of the steps utilized in the spelling mode of the invention.

FIG. 5 is an illustration of the page of a book that may be utilized in connection with the spelling mode of the invention. FIG. 6 is the corresponding flow chart. In FIG. 5 there appears an illustration of a duck 50 and its associated bar code 51. Other objects and their associated bar codes may also be depicted on the page. Also depicted are the letters of the alphabet 52, some being expressly printed while others are to be inferred from their relative position on the page. Associated with each letter is a bar code 53. As shown at step 60 of the flow chart, the student initiates the exercise by wanding the bar code under a pictured object 50. This serves to identify to controller 14 the fact that the spelling mode of operation is to be utilized, the correct spelling of the object's name, and further causes the system to audibly request the student to spell the name of that object. At step 61 the student seeks to identify the appropriate first letter of the object by wanding the bar code associated with the letter of his choice. At this time the sytem speaks this letter and at step 62 determines whether the student has selected the correct first letter of the name. In the event of an incorrect choice the controller 14 at step 63 tests to determine whether this was the first error in the attempted spelling of the name. If such is the case then at block 64 the system requests the student to try again and returns to block 61. Following in the error branch of the flow chart, if this is not the first error, the system at step 65 pronounces the name and correctly spells the name before proceeding to the end block 65 where the system awaits entry into a new exercise. Returning to step 62, if the student has selected the correct first letter of the word then at step 67 the controller 14 determines whether this is the last letter of the depicted name. If such is not the case the controller loops back to step 61 where the student seeks to identify the next letter in the name. Ultimately at step 67 the controller 14 will determine that the last letter has been correctly identified in which case the system proceeds to step 68 where the student is verbally complimented. The system then proceeds to the end block 66 and again awaits entry into a new exercise.

What is claimed is:

1. An electronic learning aid comprising:
   a student operable means for reading student selected coded indicia from a medium, said coded indicia incuding a plurality of first coded indicia each corresponding to an initialization command and a plurality of second coded indicia associated with each of said first coded indicia each second coded indicia corresponding to a displayed item;
   an initialization means responsive to reading student selected first coded indicia to request said student to arrange said associated display items in a specific sequence;
   a comparison means responsive to reading of a specific second coded indicia to determine if the corresponding displayed object has been properly located in said sequence;
   means to request said student to try again if he has improperly located a displayed item in said sequence; and
   a speech synthesis means for speaking one or more words of human language to effect said requests to said student.

2. An electronic learning aid as claimed in claim 1, wherein:
   each of said first coded indicia includes the identity of the first displayed item in said sequence, and the second coded indicia corresponding to each displayed item includes the identity of the following displayed item in the sequence.

3. An electronic learning aid as claimed in claim 1, wherein:
   said speech synthesis means speaks the name of each correctly located item and requests said student to find the next item in said sequence.

4. An electronic learning aid as claimed in any of claims 1, 2 or 3, and wherein:
   said coded indicia comprise a bar code and said means for reading comprises a bar code reader.

5. An electronic learning aid comprising:
   a student operable scanning means for reading student selected coded indicia, said coded indicia including a plurality of first coded indicia corresponding to an initialization command and second indicia corresponding to alphanumeric characters;
   an initialization means responsive to reading student selected first coded indicia for entering a test mode, selecting initial speech data and an alphanumeric character sequence corresponding to said first coded indicia;
   a comparison means responsive to reading student selected second coded indicia for selecting response speech data based upon a comparison of said second coded indicia with said selected alphanumeric character sequence when in said test mode; and
   a speech synthesis means for speaking one or more words of human language corresponding to said selected response speech data.

6. An electronic learning aid as claimed in claim 5, wherein:
   said initial speech data includes at least speech data corresponding to a word of human language; and
   selecting said alphanumeric character sequence corresponds to the spelling of said word.

7. An electronic learning aid as claimed in claim 5, wherein:
   said electronic learning aid further comprises means for selecting character speech data corresponding to alphanumeric characters upon reading student selected second coded indicia; and
   said speech synthesis means further includes means for speaking said alphanumeric character corresponding to selected character speech data.

8. An electronic learning aid as claimed in claim 5, wherein:
   said comparison means includes means for selecting speech data corresponding to a praise phrase when said student selected second coded indicia correspond to said alphanumeric sequence.

9. An electronic learning aid as claimed in claim 5, wherein:
   said comparison means includes means for selecting response speech data corresponding to a repeat entry phrase when said student selected second coded indicia fail to correspond to said alphanumeric sequence.

10. An electronic learning aid as claimed in claim 5, wherein:
    said scanning means includes an optical reading means for reading printed bar code.

11. An electronic learning aid as claimed in claim 10, wherein:
    said first coded indicia has associated therewith a picture corresponding to a word of human language;
    said initial speech data includes at least speech data corresponding to said word of human language associated with said first coded indicia; and
    said sequence of alphanumeric characters corresponds to the spelling of said word.

* * * * *